UNITED STATES PATENT OFFICE.

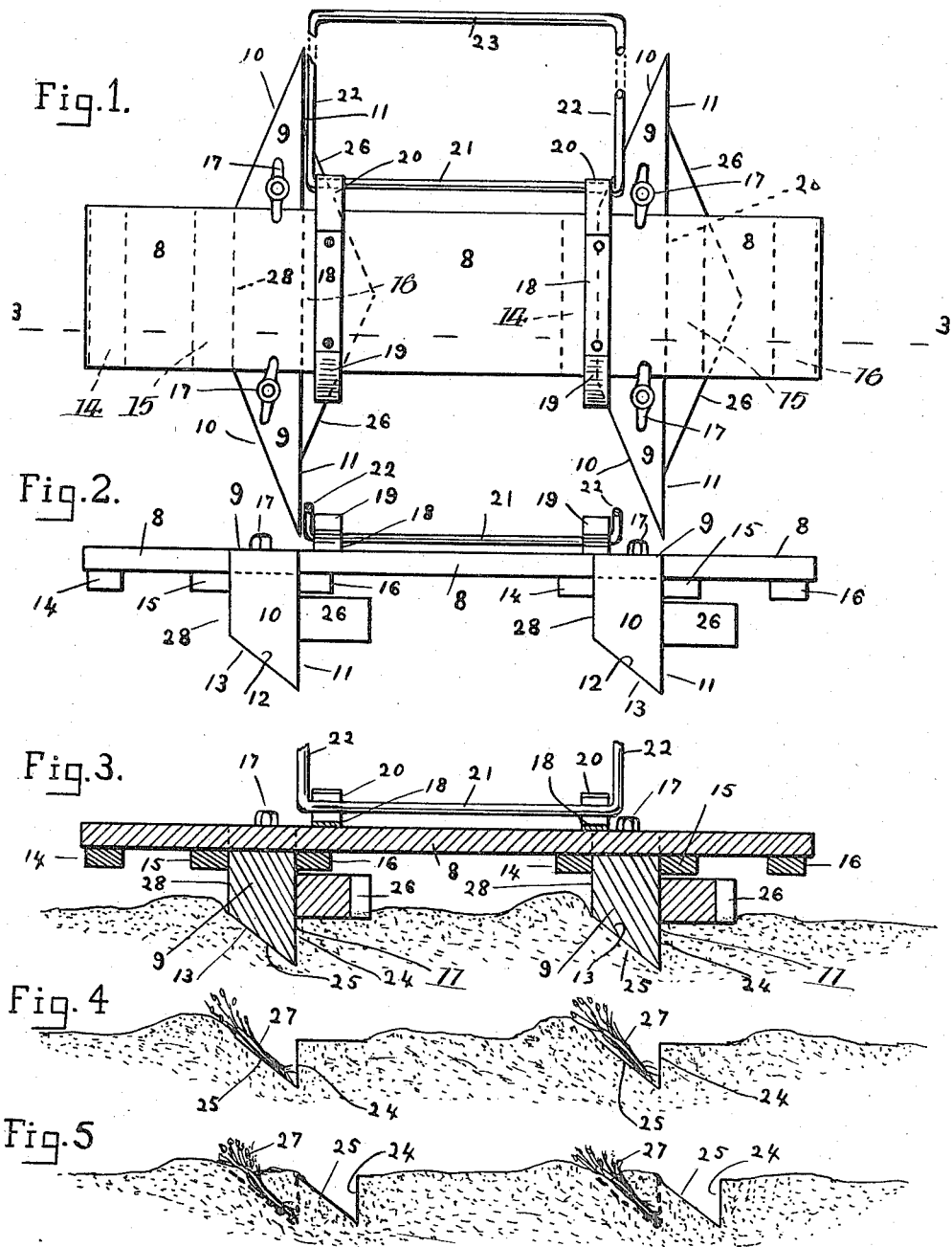

DAVID DRAPER, OF ROME, NEW YORK.

PLANTER.

1,152,402. Specification of Letters Patent. Patented Sept. 7, 1915.

Application filed February 3, 1915. Serial No. 5,972.

*To all whom it may concern:*

Be it known that I, DAVID DRAPER, of Rome, in the county of Oneida and State of New York, have invented certain new and useful Improvements in Planters; and I do hereby declare that the following is a full, clear, and exact description thereof, which will enable others skilled in the art to which it appertains to make and use the same, reference being had to the accompanying drawings, and to the reference-numerals marked thereon, which form part of this specification.

My present invention relates to that class of agricultural implements commonly called planters and used to prepare a furrow or trench for plants and later to cover over with earth the plants that have meanwhile been placed in the said trench.

The purpose of my invention is to provide a planter of the character described which is simple and economical of construction and adapted to be easily and efficiently operated.

A further purpose of this invention is to provide an improved form of such device and one that is peculiarly adapted to prepare a trench having one side slanting from the bottom of the trench to the top of the ground so that the plants may be laid by hand or otherwise on to said inclined surface and remain in such position until the trench is filled in by a subsequent movement of the planter. The planter is especially adapted for use with celery plants and similar small plants which are usually planted close together and in great numbers. The use of a trench having a slanting side allows the plants to be laid down upon said slanting side with the root end of the plant at the bottom of the trench and the other or leaf end of the plant toward or even above the top of the trench and remain in such position until the trench is filled in and the plants covered. This obviates any of the usual movements of making a hole for the plants or holding them up and surrounding them with earth or with sufficient earth to make them stand upright. I have found from experience that placing the plants at this angle does not interfere in any way with the proper growth of the plants and even improves their growth where the plants are planted as I prefer with the roots pointing toward the south and the tops of the plants pointing toward the north so that the sun tends to draw back the plants to an upright position and the earth over the roots of the plants is warmed by the direct rays of the sun and not shaded by the tops of the plants.

A further purpose of my invention is to have the planter composed of a plurality of similar plow members so that two or more trenches may be made at the same time and, furthermore, to have these plow members adjustably spaced upon the frame work of the planter so that they may be readily adjusted to a different space from each other to suit any requirements.

A further purpose is to have these plow members preferably, similarly shaped at both ends so that the planter does not have to be turned around at the end of each set of trenches to make another set of trenches or to perform the covering movement.

Further purposes and advantages of my invention will be apparent from the following specification and claims.

Figure 1 is a plan view of a planter embodying my invention. Fig. 2 is a front or rear view of said planter. Fig. 3 is a cross-sectional view on line 3—3 of said planter when in operation. Fig. 4 is a perpendicular sectional view through two trenches made by the planter and showing the plants as laid into the trenches. Fig. 5 is a perpendicular sectional view across the trenches shown in Fig. 4 after these trenches have been filled in by the second operation of the planter.

Referring to the drawings in a more particular description, the planter comprises a platform or frame work 8 below which there are mounted preferably in adjustable relation two or more plow members 9. Each plow member has its forward or earth-moving face 10 slanting rearwardly and to one side from the end of the straight or guiding side 11 of the plow member 9. The lower edge 12 of the face 10 and preferably the bottom 13 of the plow member 9 slant upwardly from the lower edge of the straight side 11 to a point approximately on a level with the top of the ground as the planter is normally used.

Preferably each plow is similarly shaped at both ends, or, in other words, provided with an earth-moving face 10 slanting back from the extreme adjacent end of the straight or guiding side 11 so that the planter may be drawn back and forth across the field without being turned around. Preferably also in order to give necessary length, weight and steadiness to the plow members, they are of such length as to have a short straight side 28 connecting the outward ends of the earth-moving faces 10.

The plow members 9 are secured in parallel position and preferably adjustably fixed to the platform or frame work 8, as by means of cleats 14, 15 and 16 upon the lower side of the platform 8 and spaced apart from each other the thickness of the plow member so that either plow member may be placed between either adjacent pair of said cleats. As shown in the drawings, the left-hand plow member is in position between cleats 15 and 16 and the right-hand member between cleats 14 and 15 upon that side of the platform. It will be obvious that the plow members may be placed farther apart by moving either one of these plow members to a position between the outer pair of cleats on that side or that both plow members may be so moved. It is obvious that this adjustability may be extended indefinitely and with a greater number of plow members than two.

The upper part of the plow members is centrally recessed to receive thereinto the platform 8 while adjustable fastening members such as buttons 17 are provided upon the top of the plow members near enough to the platform to be swung over the platform and hold the members to the platform. By swinging these buttons around in obvious manner the plows may be detached from the platform and moved to another position and again fastened to the platform.

Suitably positioned upon the platform 8 are strips 18 having forward and rearward hooks or loops 19 and 20 respectively. Into these hooks may be placed one end 21 of a rectangular handle the sides 22 of which are of suitable length so that the hand portion 23 may be readily grasped by the operator to draw the planter across the ground.

Fig. 3 shows the operation of the planter producing a pair of similarly shaped trenches, each trench having an upright side 24 and a slanting side 25 extending from the bottom of side 24 to the normal surface of the ground, the earth from the trench having been plowed up in obvious manner by the plow members and deposited to the left of the trench as viewed in the illustrations 3, 4 and 5.

Preferably I provide each of the plow members with a wing 26 slightly back from the forward end of the plow member and slanting rearwardly and in the opposite direction to the face 10 and so placed as to have its lower edge part way up on the straight side 11 so that said lower edge of this wing will be slightly below the normal level of the ground as the planter is used and extending some distance thereabove. This wing operates to shove back from the side 24 of the trench a shallow layer of earth which is usually too dry for the purpose for which the earth adjacent the upright side is to be used, namely, to cover the plants to be placed in the trench. As shown in the drawings these wings are placed in pairs, slanting back from each end of each plow member.

The operation of the planter is clearly shown in the cross-sectional view of Fig. 3 where parallel trenches are indicated with upright sides 24 and slanting sides 25. The wings 26 have shoved back from the upright sides of the trenches the upper dry crust of earth adjacent to the upright side 24. Into these trenches are placed by hand or otherwise the plants 27 as close together as desired with their roots in the deeper part of the trench and the plant reclining upon the slanting side 25 with the leaves of the plant extending above the normal level of the ground.

The next operation is to place the planter upon the ground slightly to the right of its former position so that a second series of trenches are formed, as indicated in Fig. 5, close to the trenches filled with the plants and close enough to said trenches that the moving of the planter through the earth operates to move the earth adjacent to the upright side 24 over the roots of the plants 27. As the upper and usually drier layer of earth has been removed from the surface of the ground adjacent to the upright sides 24 of the trenches, the earth so thrown over into the first series of trenches to cover the plants is good moist earth well adapted to allow the plants to start growing at once.

Preferably the trenches will be made from east to west and with their slanting sides toward the north so that the plants which are originally placed in the ground upon an incline will be drawn practically upright by the action of the sun, the original slanting position of the roots being found by experience to have no bad effects upon the plants.

What I claim as new and desire to secure by Letters Patent is.

1. In a planter, a plow member having a perpendicular side extending in the direction of travel of the planter, a face sloping to one side from said upright side and adapted to throw the earth away from said upright side and a bottom sloping upward from the lower edge of said upright side and forming a correspondingly shaped trench.

2. In a planter, a plow member having a perpendicular side extending in the direction of travel of the planter, a face sloping to one side from said upright side and adapted to throw the earth away from said upright side, a bottom sloping upward from the lower edge of said upright side and forming a correspondingly shaped trench and a wing part way up on said upright side and slanting outwardly and rearwardly therefrom and adapted to throw the upper layer of earth back from the upright side of the trench.

3. In a planter, a plow member having an upright guiding side and a face slanting outwardly and rearwardly from the front edge of said guide and having its lower edge slanting upwardly from the bottom of said guide whereby a trench is formed with one side upright and one side slanting and the earth therefrom is thrown out beyond said slanting side.

4. In a planter, a plow member having an upright guiding side and a face slanting outwardly and rearwardly from the front edge of said guide and having its lower edge slanting upwardly from the bottom of said guide whereby a trench is formed with one side upright and one side slanting and the earth therefrom is thrown out beyond said slanting side and a wing part way up on said upright side of the plow and slanting outwardly and rearwardly therefrom and adapted to throw the upper layer of earth back from the upright side of the trench.

5. In a planter, the combination of a framework and a plurality of plow members mounted thereon, each having an upright guiding side and a face slanting outwardly and rearwardly from the front edge of said guide and having its lower edge slanting upwardly from the bottom of said guide whereby a series of parallel and similar trenches are formed with one side thereof upright and one side slanting and the earth therefrom is thrown out beyond said slanting side.

6. In a planter, the combination of a framework and a plurality of plow members mounted thereon in adjustably spaced relation, each having an upright guiding side and a face slanting outwardly and rearwardly from the front edge of said guide and having its lower edge slanting upwardly from the bottom of said guide whereby a series of parallel and similar trenches are formed with one side thereof upright and one side slanting and the earth therefrom is thrown out beyond said slanting side.

7. In a planter, the combination of a framework and a plurality of plow members mounted thereon, each having an upright guiding side and a face slanting outwardly and rearwardly from the front edge of said guide and having its lower edge slanting upwardly from the bottom of said guide whereby a series of parallel and similar trenches are formed with one side thereof upright and one side slanting and the earth therefrom is thrown out beyond said slanting side and a wing part way up on the upright side of each plow, slanting outwardly and rearwardly therefrom and adapted to throw back the upper layer of earth from the upright side of the trench formed by its plow.

In witness whereof I have affixed my signature, in the presence of two witnesses, this 28th day of Jan. 1915.

DAVID DRAPER.

Witnesses:
HARRIET WILLIAMS,
S. E. HOOKS.

Copies of this patent may be obtained for five cents each, by addressing the "Commissioner of Patents, Washington, D. C."